United States Patent [19]

Sugiyama et al.

[11] Patent Number: 5,471,666
[45] Date of Patent: Nov. 28, 1995

[54] ELECTRONIC INSTRUMENT CASING

[75] Inventors: Shohji Sugiyama; Akira Tokube, both of Yokohama, Japan

[73] Assignee: Matsushita Electric Industrial Co., Ltd., Kadoma, Japan

[21] Appl. No.: 302,042

[22] Filed: Sep. 7, 1994

Related U.S. Application Data

[63] Continuation of Ser. No. 68,223, May 28, 1993, abandoned.

[30] Foreign Application Priority Data

May 29, 1992 [JP] Japan ................................... 4-139332

[51] Int. Cl.⁶ .................................................. H04B 1/38
[52] U.S. Cl. ........................... 455/348; 455/90; 455/350; 455/351; 455/347; 361/752; 361/814
[58] Field of Search ..................................... 361/614, 736, 361/752; 455/344, 347, 348, 349, 350, 351, 128, 90, 87; 379/428

[56] References Cited

U.S. PATENT DOCUMENTS

| | | | |
|---|---|---|---|
| 4,876,709 | 10/1989 | Rogers et al. | 455/89 |
| 4,890,199 | 12/1989 | Beutler | 455/300 |
| 5,155,659 | 10/1992 | Kunert | 455/90 |
| 5,201,069 | 4/1993 | Barabolak | 455/90 |
| 5,363,089 | 11/1994 | Goldenberg | 455/347 |

FOREIGN PATENT DOCUMENTS 60-38938  2/1985  Japan ........................................ 455/90

*Primary Examiner*—Reinhard J. Eisenzopf
*Assistant Examiner*—Doris To
*Attorney, Agent, or Firm*—Popham, Haik, Schnobrich & Kaufman, Ltd.

[57] ABSTRACT

An electric instrument casing in which a mounting portion is provided for mounting a cell unit on a bottom of a rectangular tubular case which detachably receives a radio unit. Further, an opening is provided in a part of a front surface of the tubular case. A front-surface panel is detachably provided so as to close the opening. The front-surface panel is provided with a ten-key sheet switch, a speaker, a microphone and the like. A flexible flat harness has a forward end thereof which is adapted to be inserted into a connector of the radio unit. An engaging piece on a top of the front-surface panel is engaged with the inside of an engaging portion that is an edge of an upper portion of the opening in the tubular case. Set screws are threaded into screw bores in mounting pieces on a lower portion of the front-surface panel through a cell-unit mounting portion of the tubular case, whereby the front-surface panel is fixedly mounted on the tubular case. The front-surface panel is demounted, whereby it is possible to easily mount the option unit on the radio unit through the opening later.

3 Claims, 4 Drawing Sheets

ELECTRONIC INSTRUMENT CASING

This is a continuation of U.S. patent application Ser. No. 08/068,223, filed May 28, 1993 now abandoned.

BACKGROUND OF THE INVENTION

The present invention relates to an electronic instrument casing for use in a portable radio instrument, a transportable radio instrument and the like.

FIG. 5 of the attached drawings shows an example of a conventional electronic instrument casing of the kind referred to above. In FIG. 5, the reference numeral 1 denotes a wireless or radio unit which is provided with a speaker 4 on an upper portion of a chassis 2 and an operation panel 3 on a side of the chassis 2. The reference numeral 5 denotes a rectangular tubular case for detachably receiving the radio unit 1, which has a battery-unit or cell-unit mounting portion 6 at a bottom thereof. The reference numeral 7 denotes a cell unit which is detachably mounted on the cell-unit mounting portion 6 of the tubular case 5. The cell unit 7 has at an upper portion thereof a pair of guide rails 8 which are adapted to be fitted in the cell-unit mounting portion 6. Alternatively, the speaker 4 may be provided on the tubular case 5. After the radio unit 1 has been received in the tubular case 5, the guide rails 8 of the cell unit 7 are fitted in the cell-unit mounting portion 6 at the bottom of the tubular case 5, whereby power is supplied from the cell unit 7 to the radio unit 1. Accordingly, inputting operation is performed on the operation panel 3, whereby radio or wireless talking or speaking can be done through the speaker 4 and a microphone (not shown).

In the conventional electronic instrument casing, however, when an option unit such as a recording and reproducing (playback) unit or the like is to be added thereto, such operation is required, in which the radio unit 1 is once extracted from the tubular case 5, the option unit is fixedly mounted on the chassis 2 and, subsequently, the radio unit 1 is again received in the tubular case 5. For this reason, when the radio unit 1 is mounted on and demounted from the tubular case 5, an electric contacting condition sometimes changes to make electric performance unstable. Further, there is a problem that, when the option unit is to be mounted on the radio unit 1, metal waste and refuse enter into the radio unit 1, so that mounting parts are damaged or broken down.

SUMMARY OF THE INVENTION

The invention is directed to solving the above-discussed conventional problem, and it is an object of the invention to provide a superior electronic instrument casing in which an option unit and the like can easily be mounted.

In order to achieve the above-described object, according to the invention, an opening is formed in a portion of a front surface of a hollow or tubular case which detachably receives a radio unit, and the opening is detachably closed up by a front-surface panel.

Furthermore, according to the invention, an engaging piece is provided on one of the hollow or tubular case and the front-surface panel, an engaging portion engageable with the engaging piece is provided on the other of the tubular case and the front-surface panel, and the front-surface panel is fixedly mounted by screw means to a cell-unit mounting portion of the hollow or tubular case.

Accordingly, according to the present invention, the front surface panel can be readily mounted on and demounted from the hollow or tubular case while the radio unit is received in the hollow or tubular case, and the option unit can be mounted on the radio unit through the opening on the front side of the hollow or tubular case by demounting the front surface panel from the hollow or tubular case, so that the user can readily effect the mounting of the option unit later.

DESCRIPTION OF THE PREFERRED EMBODIMENTS

Figure 1:
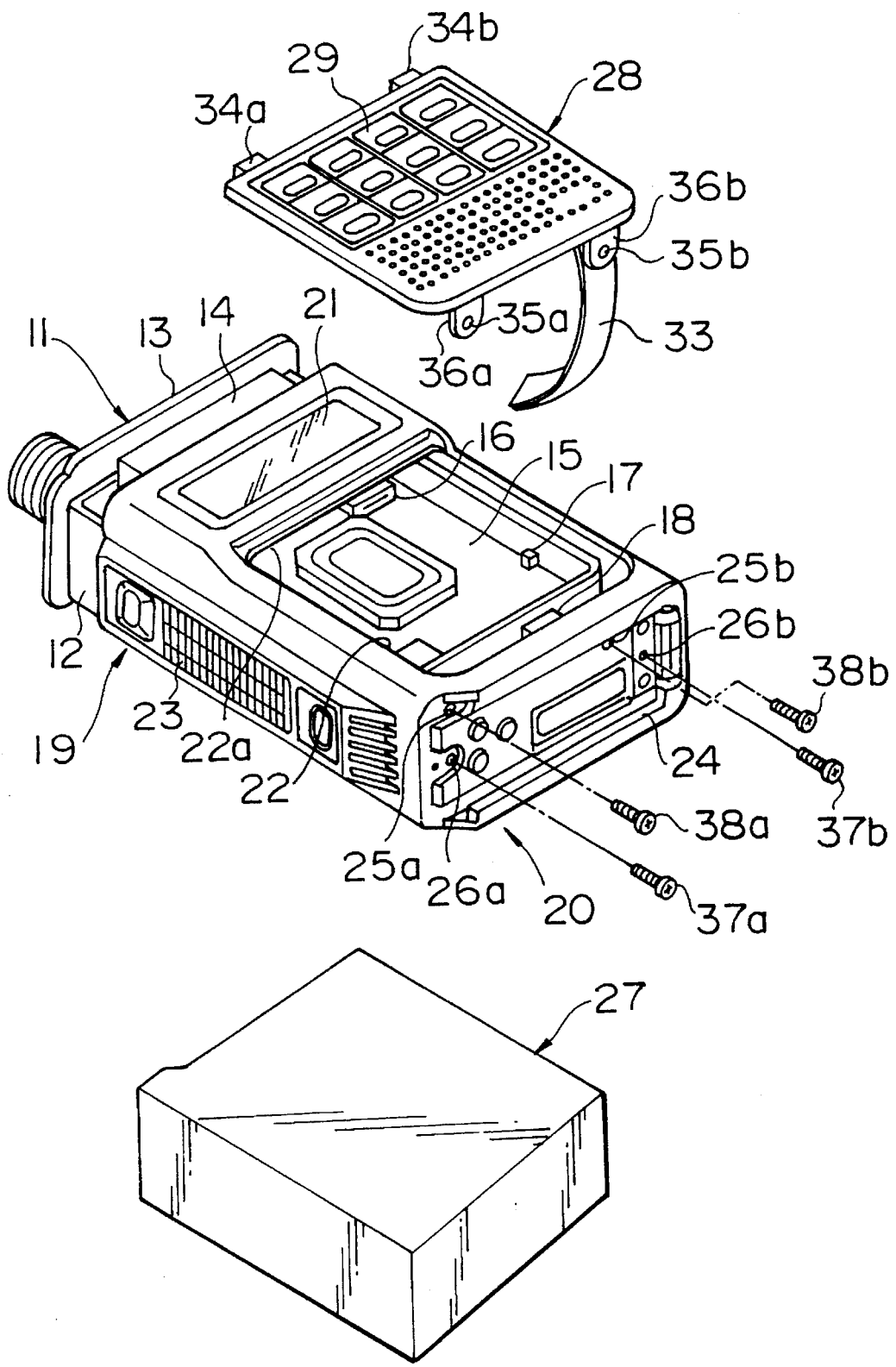
FIG. 1 is an exploded perspective view of an electronic instrument casing according to an embodiment of the invention.
Figure 2:
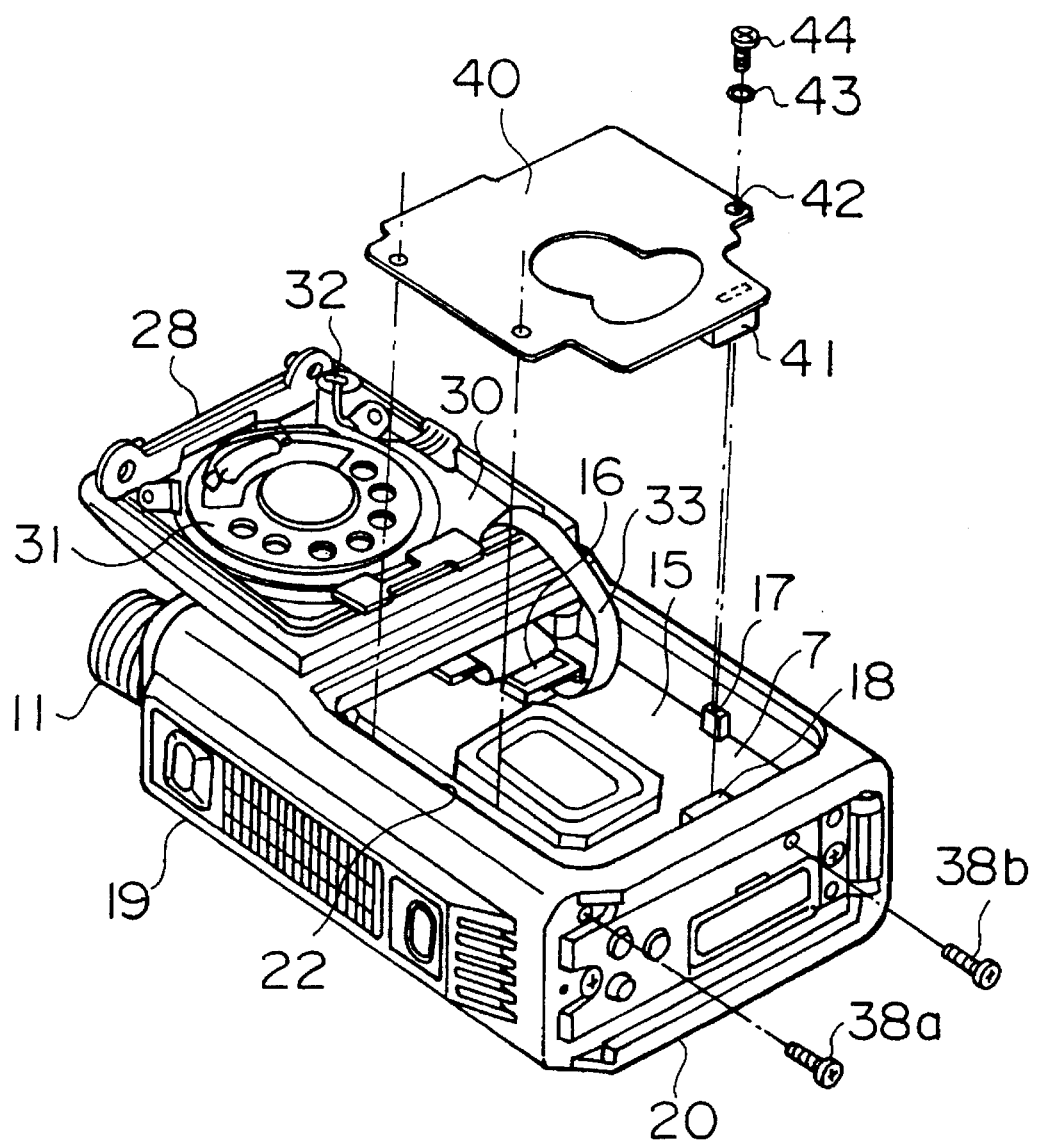
FIG. 2 is a perspective view showing a state in which a front-surface panel of the electronic instrument panel illustrated in FIG. 1 is opened.

FIG. 1 shows an embodiment according to the invention. In FIG. 1, the reference numeral 11 denotes a wireless or radio unit which is provided with an operation panel 13 at the top of a frame-like chassis 12 and which is provided below the operation panel with an LCD 14 that is a display device. Moreover, a printed circuit board 15 is arranged inside of the chassis 12. A front-surface panel connector 16, an option-unit mounting portion 17 and an option-unit connector 18 are provided on the printed circuit board 15. The reference numeral 19 denotes a hollow or rectangular tubular case which detachably receives the radio unit 11. The hollow or tubular case 19 has at a bottom thereof a battery-unit or cell-unit mounting portion 20. Am opening 22 is formed in the hollow or tubular case 19 to be disposed clear of an LCD transparent window 21 at the front surface of the hollow or tubular case 19. Furthermore, a press button 23 is provided on one side surface of the hollow or tubular case 19. A pair of guide rails 24 are provided on the cell-unit mounting portion 20 which is provided with pairs of screw threading bores 25a and 25b, and 26a and 26b. The reference numeral 27 denotes a cell or battery unit provided with a pair of guide rails (not shown) which are adapted to detachably engage the guide rails 24 of the cell-unit mounting portion 20 at the bottom of the hollow or tubular case 19. The reference numeral 28 denotes a front-surface panel which openably closes the opening 22 in the front surface of the hollow or tubular case 19. The front-surface panel 28 is provided on a surface thereof with a ten-key sheet switch 29. As shown in FIG. 2, the front-surface panel 28 is provided on a rear surface thereof with a printed circuit board 30 which is provided with a speaker 31 and a microphone 32. A flexible flat harness 33 is extended from the printed circuit board 30, and has a forward end portion which is adapted to be inserted into the front-surface panel connector 16 provided on the printed circuit board 15 of the radio unit 11. Further, as shown in FIG. 1, a pair of engaging pieces 34a and 34b are formed on the top of the front-surface panel 28.

A pair of mounting pieces 36a and 36b having respective threaded bores 35a and 35b thereof are formed on the underside of the front-surface panel 28.

Figure 3:
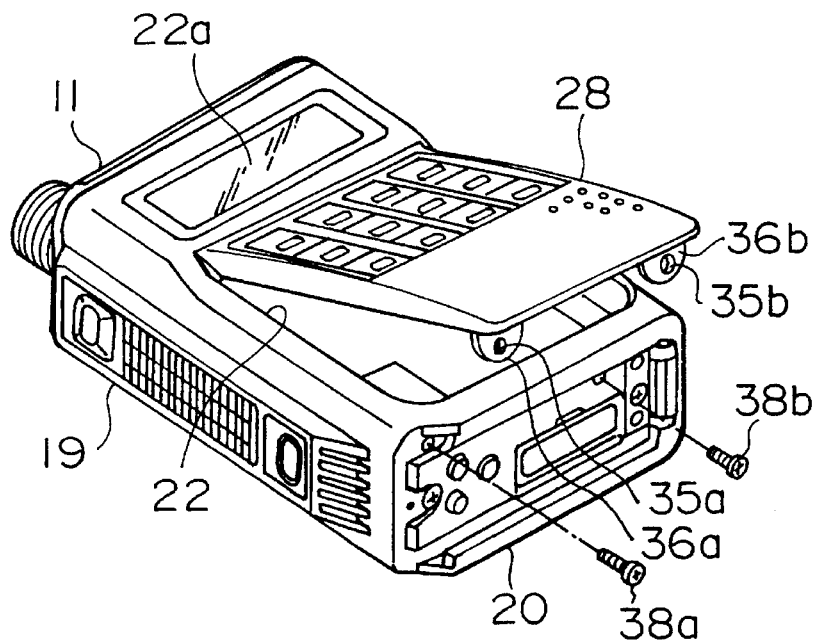
FIG. 3 is a perspective view showing a state just before the front-surface panel of the electronic instrument panel illustrated in FIG. 1 is closed.
Figure 4:
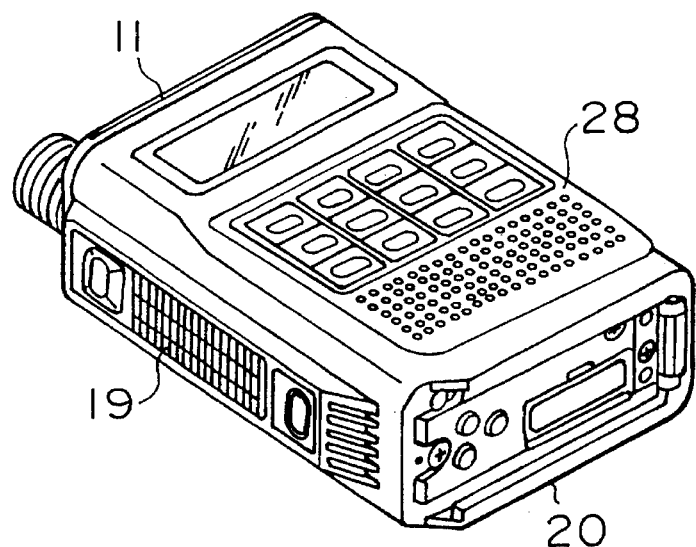
FIG. 4 is a perspective view showing a state in which the front-surface panel of the electronic instrument casing illustrated in FIG. 1 is closed.
Figure 5:
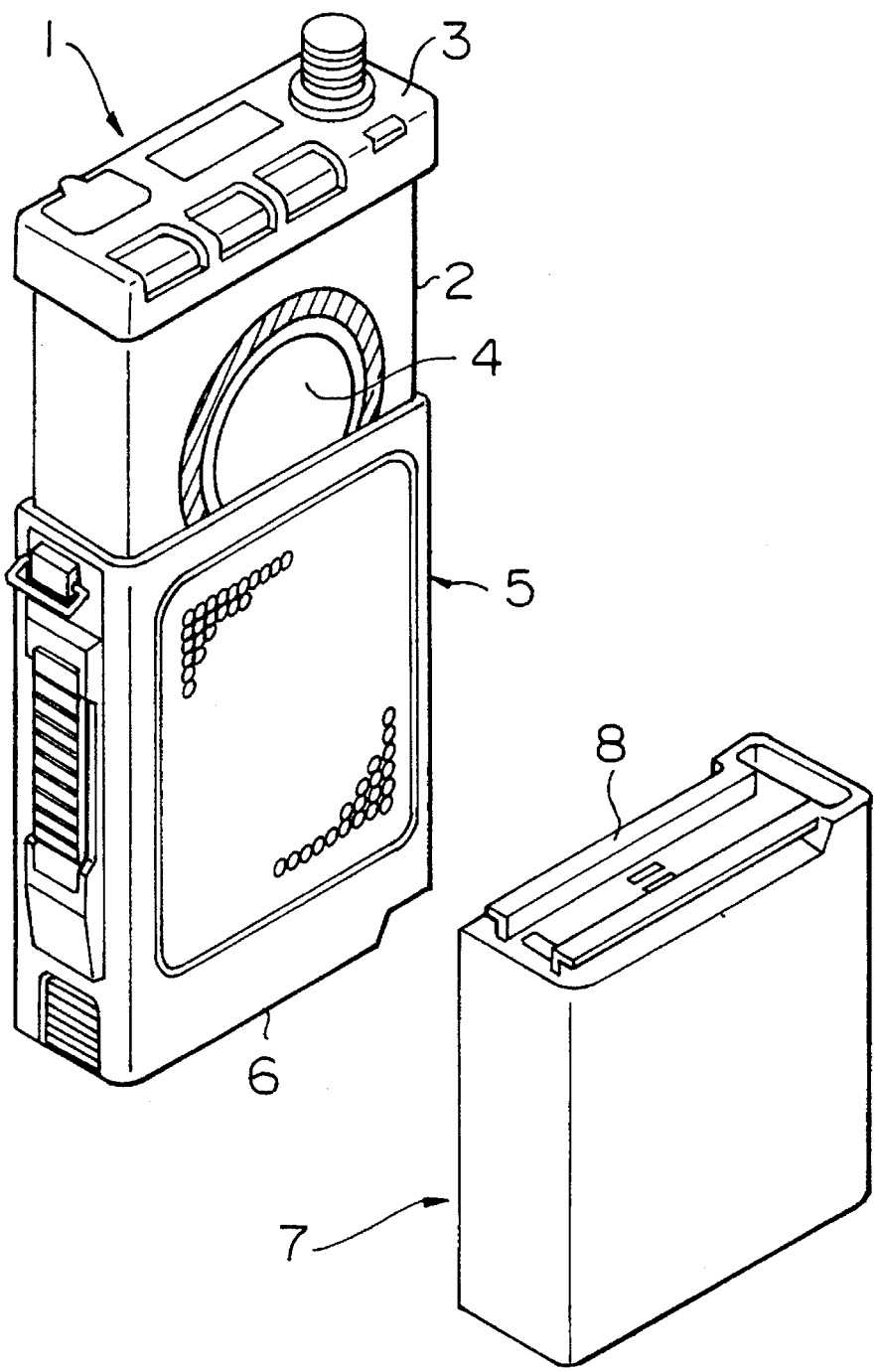
FIG. 5 is a perspective view showing an example of a conventional electronic instrument casing.

Assembling operation of the above-described embodiment will next be described. In FIG. 1, the radio unit 11 is first received in the hollow or tubular case 19. A pair of set screws 37a and 37b are inserted through the screw through bores 26a and 26b to fixedly mount the radio unit 11 on the hollow or tubular case 19. Subsequently, the forward end of the flexible flat harness 33 on the front-surface panel 28 is inserted into the front-panel connector 16 on the radio unit 11. The engaging pieces 34a and 34b on the top of the front-surface panel 28 are engaged with the inside of an engaging portion 22a that is an edge of the upper portion of the opening 22 in the hollow or tubular case 19. Thus, as show in FIGS. 3 and 4, the opening 22 in the hollow or tubular case 19 is closed by the front-surface panel 28. Subsequently, a pair of set screws 38a and 38b are screwed from outside respectively into the pair of threaded bores 35a and 35b in the respective mounting pieces 36a and 36b provided on the underside of the front-surface panel 28, to fixedly mount the front-surface panel 28 on the hollow or tubular case 19. Subsequently, the guide rails on the cell unit 27 are fitted respectively onto the guide rails 24 of the cell-unit mounting portion 20 on the bottom of the hollow or tubular case 19, whereby the cell unit 27 is fixedly mounted on the hollow or tubular case 19. Thus power is supplied to the radio unit 11 from the cell unit 27. Inputting operation is performed on the operation panel 13, whereby it is possible to perform radio talking or call through the speaker 31 and the microphone 32. In this connection, an engaging piece may be provided on the hollow or tubular case 19, and an engaging portion is correspondingly provided on the front-surface panel 28 to engage with the engaging piece on the tubular case 19.

Operation at the time when the option unit is to be mounted later will next be described with reference to FIG. 2. In FIG. 2, the reference numeral 40 denotes an option unit such as a recording and reproducing (playback) unit or the like; 41 a connector adapted to be connected to the option-unit connector 18 of the radio unit 11; 42 screws through bores adapted for fixedly mounting the option unit 40 on the printed circuit board 15 of the radio unit 11; and 43 and 44 washers and set screws for the fixed mounting, respectively.

The cell unit 27 is first demounted from the hollow or tubular case 19. Alternatively, before the cell unit 27 is mounted on the hollow or tubular case 19, the pair of set screws 38a and 38b are disengaged, and the front-surface panel 28 is removed from the opening 22 in the hollow or tubular case 19 to be turned over on the hollow or tubular case 19. The option unit 40 is placed on the printed circuit board 15 of the radio unit 11 through the opening 22. The connector 41 is inserted into the option-unit connector 18. Subsequently, the set screws 44 passing through the washers 43 are inserted through the screw through bores 42 and are screwed into the option-unit mounting portion 17 on the radio unit 11 to mount the option unit 40 on the radio unit 11. Subsequently, the front-surface panel 28 is put back in its place to close the opening 22. The front-surface panel 28 is fixedly mounted on the hollow or tubular case 19 by the set screws 38a and 38b.

In this manner, according to the above-described embodiment, the front-surface panel 28 is detachably mounted on the hollow or tubular case 19, and mounts thereon the ten-key sheet switches 29, the speaker 31, the microphone 32 and the like, which makes it possible to easily perform these mounting and demounting. Further, the mounting of the speaker 31, the microphone 32 and the like on the front-surface panel 28 separate from the radio unit 11 can advantageously improve tone quality and sound pressure with respect to these elements. Moreover, it is possible through disengaging the front-surface panel 28 from the hollow or tubular case 19 to perform mounting and demounting of the option unit 40 on and from the radio unit 11 through the opening 22 in the hollow or tubular case 19. The embodiment of the invention saves trouble of taking the radio unit in and out from the hollow or tubular case in order to mount the option unit, as in the prior art. Furthermore, it is possible in the invention to eliminate instability in electrical connection between the radio unit and the hollow or tubular case which would occur by such taking-in and -out.

As will be apparent from the above-described embodiment, according to the present invention, the front surface panel can be readily mounted on and demounted from the hollow or tubular case while the radio unit is received in the hollow or tubular case, and the option unit can be mounted on the radio unit through the opening on the front side of the hollow or tubular case by demounting the front surface panel from the hollow or tubular case, so that the user can readily effect the mounting of the option unit later.

Furthermore, according to the present invention, an engaging piece is provided on one of the hollow or tubular case and the front surface panel and another engaging piece engageable with said engaging piece is provided on the other of the hollow or tubular case and the front surface panel, and screw means is provided for attaching the front surface panel to the cell-unit mounting portion of the hollow or tubular case whereby the front surface panel can be readily mounted on and demounted from the hollow or tubular case.

What is claimed is:

1. An electronic instrument casing comprising:
   a hollow case for detachably receiving a radio unit, said hollow case having a front surface side, an opening formed in a portion of said front surface side, and a cell-unit mounting portion formed separately from said opening;
   a front-surface panel configured to detachably close said opening in said front surface side of said case, said front-surface panel having a front surface and a rear surface, a sheet switch having a plurality of keys provided on said front surface, and a first printed circuit board provided on said rear surface, said first printed circuit board being provided with a speaker and a microphone;
   a second printed circuit board located on said radio unit;
   a flexible harness connecting said second printed circuit board to said first printed circuit board;
   a first engaging piece provided on one of said hollow case and said front-surface panel;
   a second engaging piece engageable with said first engaging piece and provided on the other of said hollow case and said front-surface panel; and
   screw means for securing said front-surface panel to said cell-unit mounting portion of said hollow case.

2. The electronic instrument casing according to claim 1, further comprising an option unit mounted on said second printed circuit board and fitting in said opening in said front surface side of said hollow case.

3. The electronic instrument casing according to claim 1, wherein said sheet switch has 10 keys.

* * * * *